(12) United States Patent
Lin

(10) Patent No.: US 7,669,504 B2
(45) Date of Patent: Mar. 2, 2010

(54) BICYCLE PEDAL

(75) Inventor: Wen-Hwa Lin, Taichung Hsien (TW)

(73) Assignee: VP Components Co., Ltd., Taichung Hsien (TW)

( * ) Notice: Subject to any disclaimer, the term of this patent is extended or adjusted under 35 U.S.C. 154(b) by 401 days.

(21) Appl. No.: 11/787,305

(22) Filed: Apr. 16, 2007

(65) Prior Publication Data

US 2008/0250896 A1 Oct. 16, 2008

(51) Int. Cl.
*B62M 3/08* (2006.01)
(52) U.S. Cl. ..................................... 74/594.4
(58) Field of Classification Search ............... 74/594.4, 74/594.6
See application file for complete search history.

(56) References Cited

U.S. PATENT DOCUMENTS

| 2,568,443 | A | * | 9/1951 | Gerner et al. ............... 74/594.4 |
| 2,751,797 | A | * | 6/1956 | Pearl ......................... 74/594.4 |
| 3,798,997 | A | * | 3/1974 | Konzorr ..................... 74/594.4 |
| 7,013,754 | B2 | * | 3/2006 | Milanowski ............... 74/594.6 |
| 2006/0266154 | A1 | * | 11/2006 | Hermansen et al. ........ 74/594.4 |

FOREIGN PATENT DOCUMENTS

DE 3631410 A1 * 3/1988

* cited by examiner

*Primary Examiner*—Vicky A Johnson
(74) *Attorney, Agent, or Firm*—Charles E. Baxley

(57) ABSTRACT

A bicycle pedal comprises a central block combined with an upper block settled thereon and with a lower block settled thereunder. The central block, the upper block and the lower block are all formed in one piece, respectively. Further, the upper block and the lower block are identical in shape and have the same features because they are formed by means of an identical mold. The central block has an axial bolt tube and two stepping portions. The upper block and the lower block each provides a receiving portion, a plurality of ribs and two stepping portions. Thereby, when the receiving portions engage the axial bolt tube, the stepping portions of the central block, the upper block and the lower block can be combined as a stepping frame by means of a plurality of fastening components.

10 Claims, 5 Drawing Sheets

BICYCLE PEDAL

BACKGROUND OF THE INVENTION

1. Technical Field

The present invention relates to bicycle pedals and, more particularly, to a bicycle pedal having an easily molded and easily fabricated structure.

2. Description of Related Art

FIG. 1 illustrates a conventional one-piece bicycle pedal. The one-piece bicycle pedal comprises a stepping frame and an axial tube traversing the stepping frame through the center thereof. The axial tube is provided for receiving bearings and an axial shaft. Thereby, an external threaded portion formed at one end of the axial shaft can be coupled to an end of a crank of a bicycle. However, due to, some technical limitations, such as mold making, forming and mold parting, a conventional one-piece pedal typically has a simple structure and is only capable of providing a simple function of driving a bicycle crank when being pedaled. However, this may cause some weaknesses of such one-piece pedal, such as the changeless shape and color as well as the plain design. Moreover, once the one-piece pedal gets partially deformed or damaged, the whole pedal may fail to function and need to be replaced as a whole. This is somehow uneconomic to a user.

In addition to aforesaid one-piece pedals, there are combination pedals in the market, such as those disclosed in U.S. Pat. No. 7,024,961 and U.S. Pat. No. 7,021,175. As those combination pedals are typically designed for one or more particular functions, the relatively more complicated shapes, components and fabrication thereof are consequently requisite. Accordingly, the manufacturing costs and selling prices are relatively higher. Besides, even though the pedal may be repaired by replacing the damaged components sectionally, it is difficult for a user to replace these components by himself.

SUMMARY OF THE INVENTION

The present invention has been accomplished under these circumstances. The disclosed subject matter is a compromise between the one-piece pedal and a combination pedal. The present invention provides a simplified combination pedal, which is characterized by its reduced components and relatively easier fabrication.

Thereupon, the disclosed bicycle pedal comprises a central block combined with an upper block settled thereon and with a lower block settled thereunder. The central block, the upper block and the lower block are all formed in one piece, respectively. Further, the upper block and the lower block are identical in shape and have the same features because they are formed by means of an identical mold. The central block has an axial bolt tube and two stepping portions. The upper block and the lower block each provides a receiving portion, a plurality of ribs and two stepping portions. Thereby, when the receiving portions engage the axial bolt tube, the stepping portions of the central block, the upper block and the lower block can be combined as a stepping frame by means of a plurality of fastening components.

It is one objective of the present invention to provide a simplified bicycle pedal composed of a central block, an upper block, a lower block and a plurality of fastening components. As the upper block and lower block are identical in shape and feature, and can be formed with a single mold, there are only two molds required for the three blocks. To a manufacturer, this facilitates reducing the costs of mold making. On the other hand, since the simplified components are easy to be fabricated, the consumed time and processes for fabrication can be reduced.

It is another objective of the present invention to provide a bicycle pedal, the central, upper and lower blocks of which can be imparted with different colors during mold forming so that the pedal can show varied color combinations.

It is another objective of the present invention to provide a bicycle pedal, the components of which can be replaced separately by a user himself. Therefore, when one of the components gets damaged, the user needs not to change the whole pedal.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
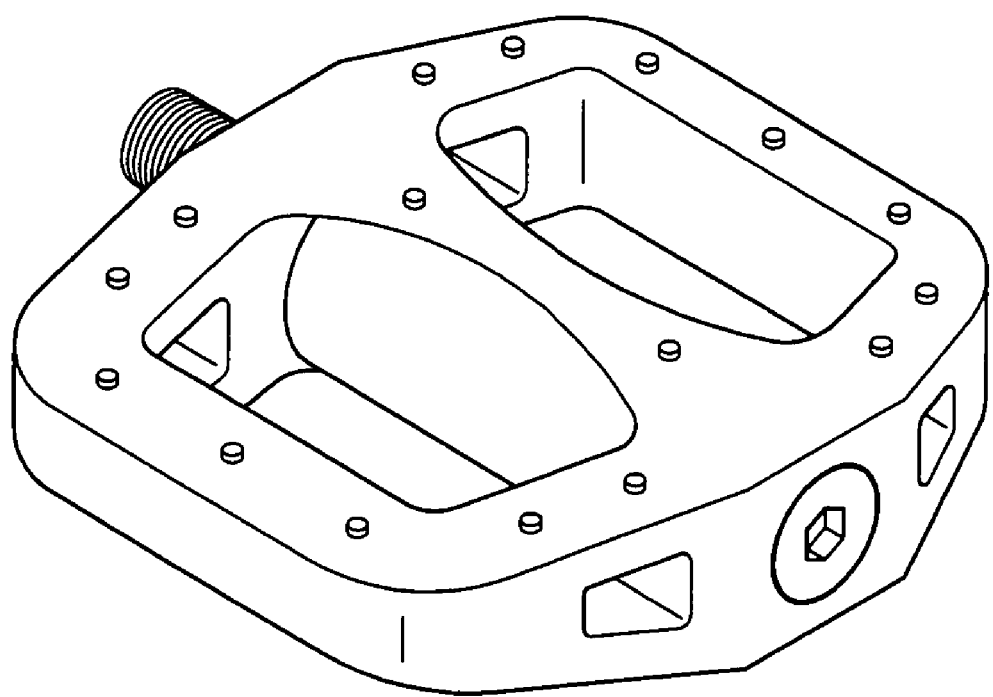
FIG. 1 is a perspective view of a conventional one-piece pedal.
Figure 2:
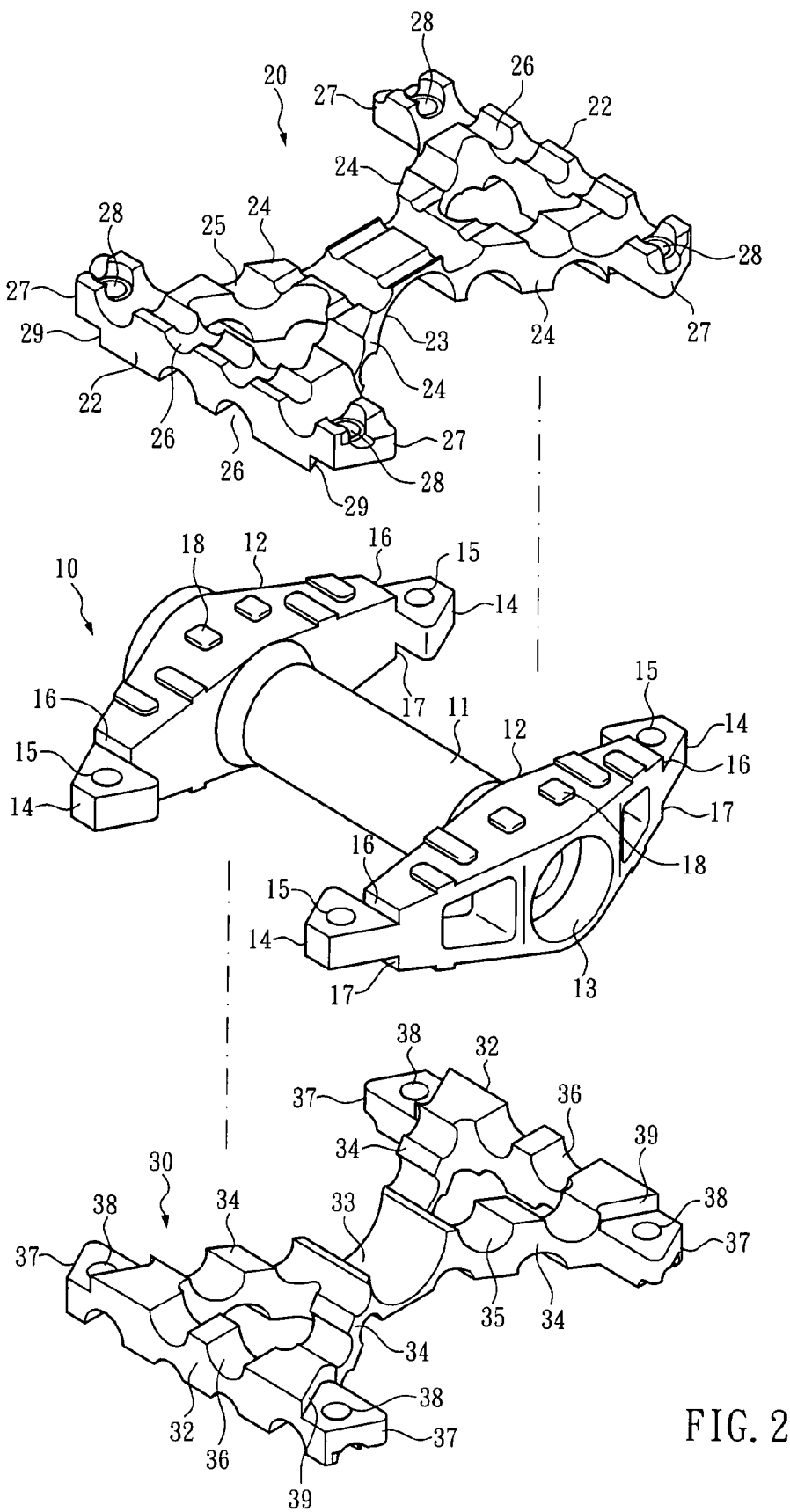
FIG. 2 is an exploded view of the disclosed pedal according to the present invention.
Figure 3:
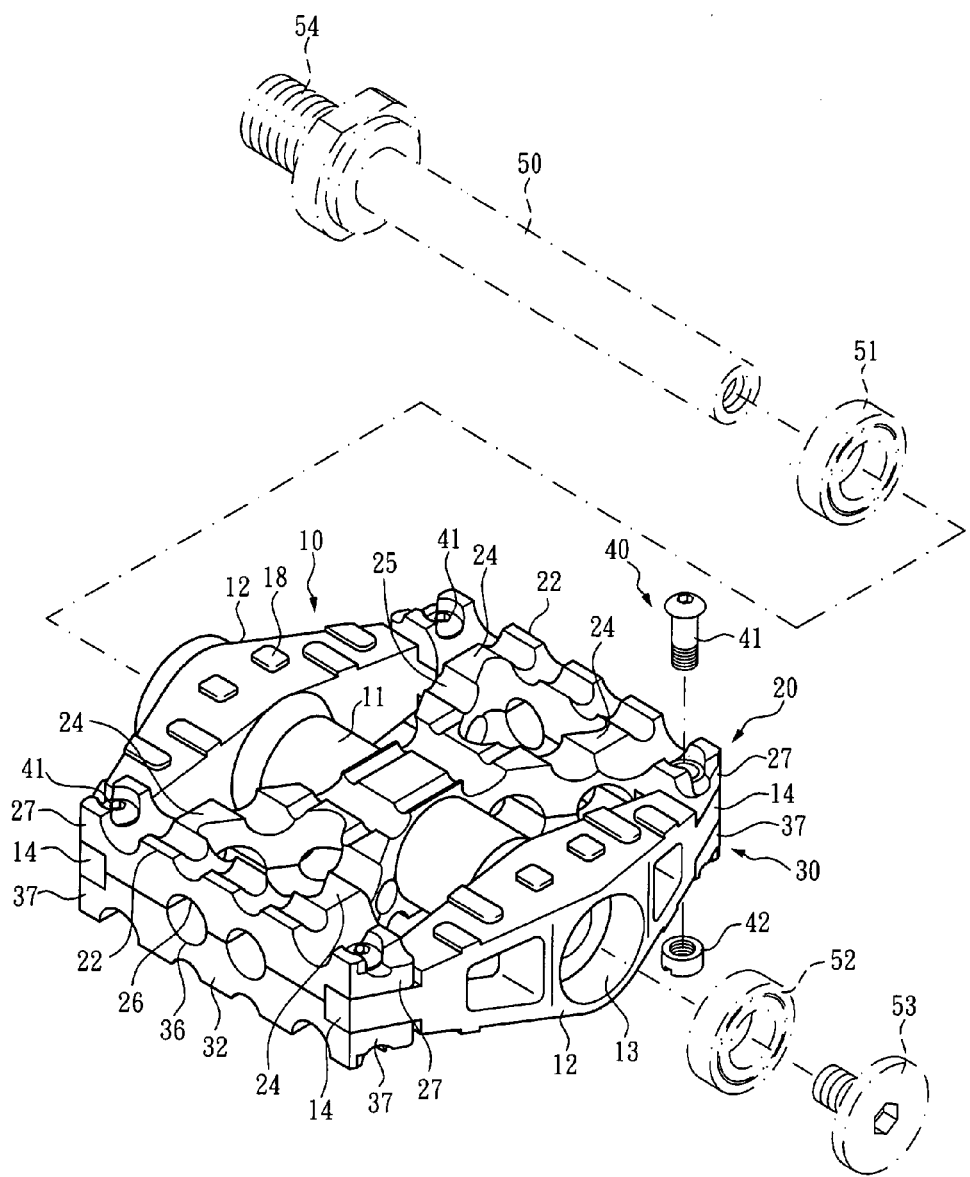
FIG. 3 is an assembly drawing of the disclosed pedal according to the present invention.
Figure 4:
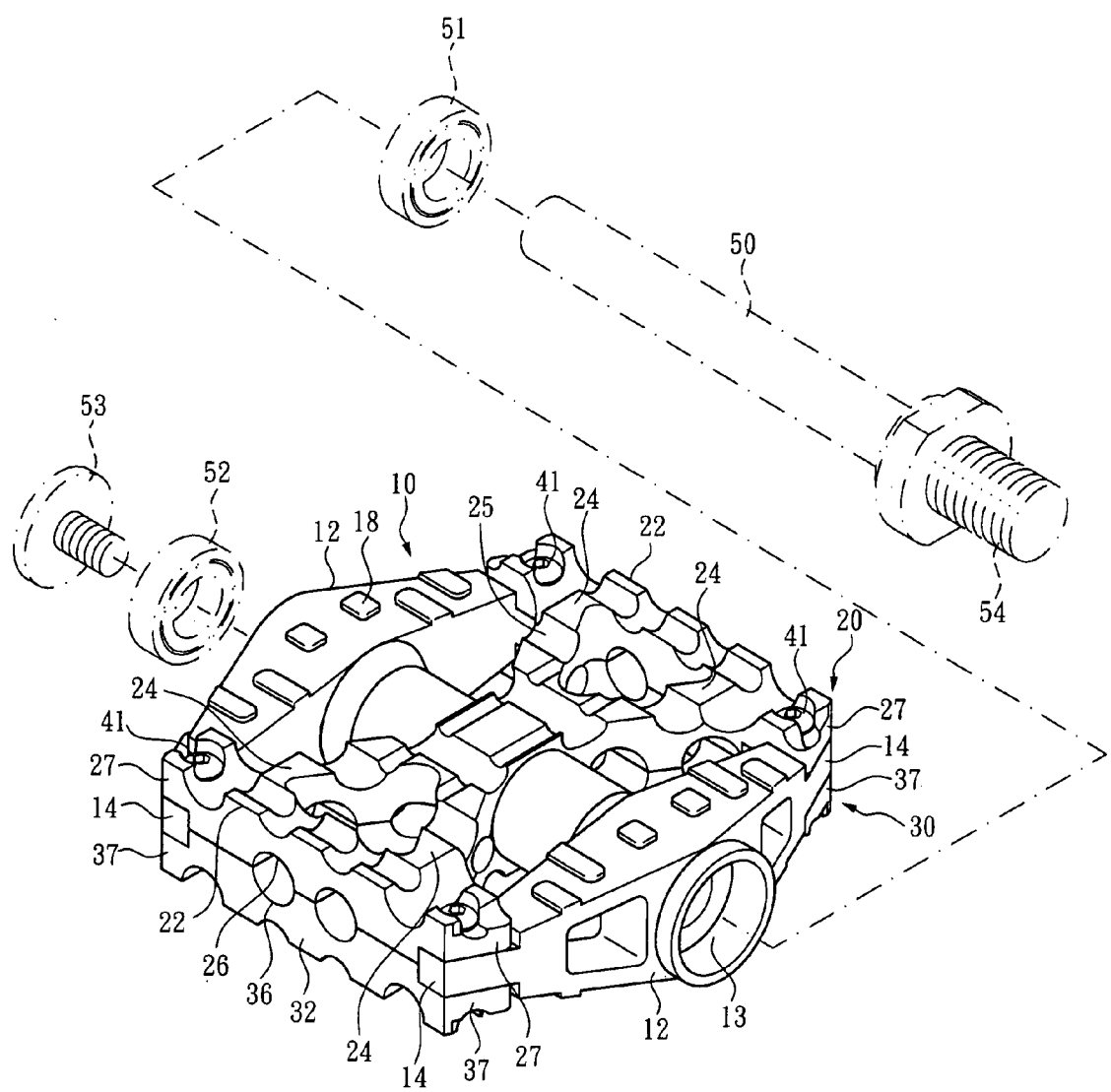
FIG. 4 is another assembly drawing of the disclosed pedal according to the present invention taken from the opposite direction relative to FIG. 3.
Figure 5:
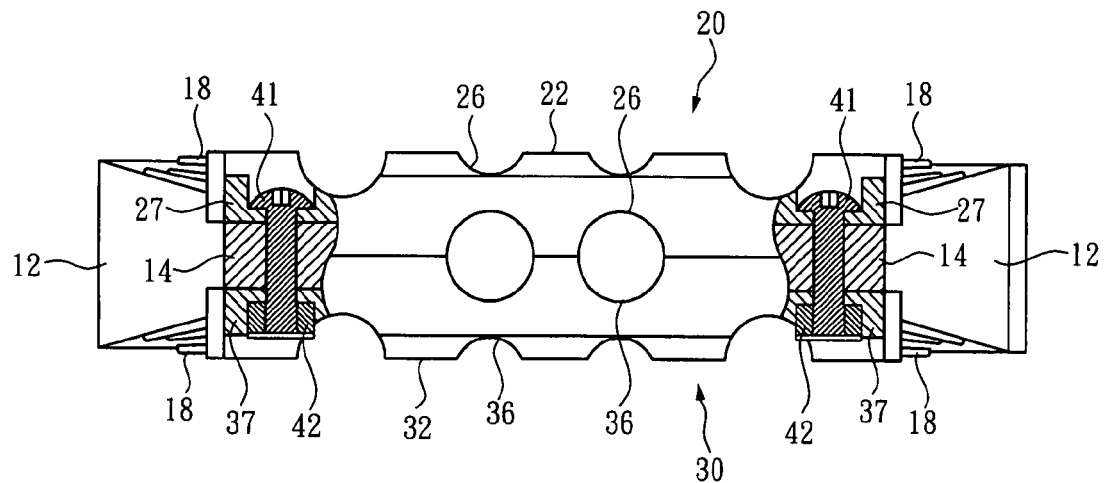
FIG. 5 is a front view of the disclosed pedal according to the present invention with the fastening portions sectioned.
Figure 6:
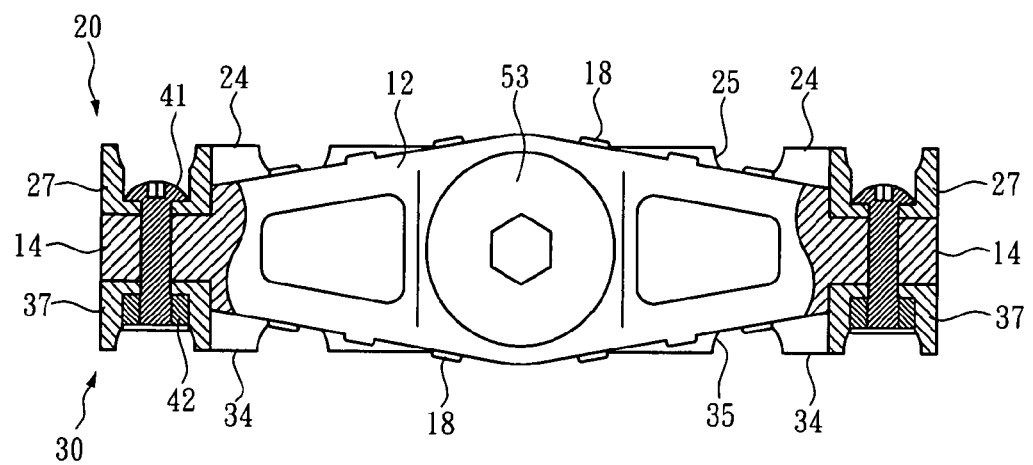
FIG. 6 is a lateral view of the disclosed pedal according to the present invention with the fastening portions sectioned.

In FIGS. 2, 3 and 4, the pedal of the present invention is composed of a central block 10, an upper block 20, a lower block 30 and a plurality of fastening components 40.

The central block 10 is formed in one piece and comprises an axial bolt tube 11 and two stepping portions 12, each formed around one end of the axial bolt tube 11. The axial bolt tube 11 is hollow and has two bearing recesses 13, each formed at the position corresponding to the center of a respective said stepping portion 12. Each said stepping portion 12 has two fastening portions 14, each shaped as a platform and positioned at one end of the stepping portion 12. Further, each said fastening portions 14 has a fastening hole 15. Since the thickness of the fastening portion 14 is smaller than the thickness of the end of the stepping portion 12, an upper retaining surface 16 and a lower retaining surface 17 are formed at the boundary between the fastening portion 14 and the adjacent stepping portion 12. An anti-slip structure constructed from a plurality of anti-slip protrusions 18 is provided on the surfaces of the stepping-portions 12, respectively.

The upper block 20 and lower block 30 are formed by means of an identical mold thus are identical in shape and have the same features. The upper block 20 is hereinafter described as an instance. The upper block 20 is formed as one piece and comprises a semicircular and fillister-shaped receiving portion 23, a plurality of ribs 24 radially extended from the periphery of the receiving portion 23 and a plurality of stepping portions 22 formed at the ends of the ribs 24. The upper and lower surfaces of each said rib 24 have an anti-slip structure, respectively, which is constructed from a plurality of grooves 25. The grooves 25 make the upper and lower surfaces of the rib 24 become rough so as to provide proper friction. Also, the upper and lower surfaces of each said stepping portion 22 are equipped with an anti-slip structure, respectively, which is constructed from a plurality of grooves 26 so as to provide proper friction. Each said stepping portion 22 has two fastening portions 27, each formed at an end thereof. The fastening portion 27 comprises a fastening hole 28 for accommodating a countersunk bolt. The thickness of the fastening portion 27 is smaller than the thickness of the end of the stepping portion 22. Thus a lateral retaining surface 29 is formed at the boundary between the fastening portion 27 and the adjacent stepping portion 22.

The lower block 30 has the same shape and features as the upper block 20. The lower block 30 also includes a pair of stepping portions 32, a receiving portion 33, a plurality of ribs 34, a plurality of grooves 35, 36, a plurality of fastening portions 37, a plurality of fastening holes 38 and a plurality of lateral retaining surfaces 39.

In FIGS. 3, 4, 5 and 6, the central block 10, the upper block 20 and the lower block 30 which are assembled are illustrated. The upper block 20 and the lower block 30 are positioned on or under the central block 10, respectively, in the manner that the receiving portions 23, 33 at the center of the upper and lower blocks 20, 30 jointly construct a round hole for snugly enclosing the periphery of the axial bolt tube 11 of the central block 10. At this time, the fastening portions 27 of the upper block 20 are placed upon the fastening portions 14 of the central block 10 and the upper and lower retaining surfaces 16, 17 of the central block 10 butt on an adjacent side of the fastening portions 27, 37 of the upper and lower blocks 20, 30, respectively. The lateral retaining surfaces 29 of the fastening portions 27 of the upper block 20 butt on an adjacent side of the fastening portions 14 of the central block 10 while the lateral retaining surfaces 39 of the fastening portions 37 of the lower block 30 butt on the adjacent sides of the fastening portions 14 of the central block 10, respectively. At this time, the stepping portions 22 and the rib 24 of the upper block 20 mate with the correspondingly positioned stepping portions 32 and the ribs 34 of the lower block 30. Thereby, a stepping frame of the pedal of the present invention is constructed. Then a plurality of fastening components 40 can pass the fastening holes 15, 28, 38 to fasten the mated fastening portions 14, 27, 37 so that the central block 10, upper block 20 and lower block 30 can be firmly combined. Each said fastening component 40 is composed of a bolt 41 and a nut 42.

Through the figures, it can be seen that when the upper block 20 and lower block 30 are combined, the adjacent grooves 26, 36 on the mutually contacted stepping portions 22, 32 can jointly construct holes with a particular shape. In the present embodiment, the grooves 26, 36 are semicircular, so that the constructed holes are round holes. The holes with a complete shape help enhancing the appearance of the disclosed pedal aesthetically.

After the pedal is assembled, the axial bolt tube 11 of the central block 10 can allow an axial shaft 50 to pass therethrough. The two bearing recesses 13 accommodate a bearing 51, 52, respectively for bearing the axial shaft 50. One end of the axial shaft 50 is screwed with a sealing component 53 to seal the adjacent bearing recess 13. The other end of the axial shaft 50 is formed as an externally threaded segment 54 and is diametrically enlarged. The externally threaded segment 54 seals the adjacent bearing recess 13 and is screwed to a crank of a bicycle (not shown).

Aforesaid stepping frame of the pedal constructed by the stepping portions 12, 22, 32 permits a user to pedal thereon and the grooves 26, 36 or the anti-slip protrusions 18 on the surfaces of the stepping portions 12, 22, 32 provide friction during the user's stepping the pedal so as to prevent the user's foot from slipping off the pedal.

Although a particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. A bicycle pedal, comprising:
 a central block, formed in one piece and comprising an axial bolt tube and two stepping portions, each formed around one end of the axial bolt rube wherein the axial bolt tube is hollow and has two bearing recesses, each formed at the position corresponding to the center of a respective said stepping portion wherein each said stepping portion has two fastening portions, each positioned at one end of the stepping portion and having a fastening hole;
 an upper block formed in one piece and having a fillister-shaped receiving portion, a plurality of ribs extended from the periphery of the receiving portion and a plurality of stepping portions formed at the ends of the ribs, wherein each said stepping portion has two fastening portions, each formed at an end thereof and each said fastening portion comprises a fastening hole for accommodating a countersunk bolt, and
 a lower block, formed in one piece and having a fillister-shaped receiving portion, a plurality of ribs extended from the periphery of the receiving portion and a plurality of stepping portions formed at the ends of the ribs, wherein each said stepping portion has two fastening portions, each formed at an end thereof and each said fastening portion comprises a fastening hole for accommodating a countersunk bolt;
 thereby, when the upper and lower blocks are positioned on or under the central block, respectively, with the receiving portions of the upper and lower blocks enclosing the axial bolt tube of the central block, the fastening portions of the upper block being placed upon the fastening portions of the central block while the fastening portions of the lower block being placed under the fastening portions of the lower block being placed under the fastening portions of the central block so that a countersunk bolt can be settled in each set of the adjacent fastening holes of the upper and lower blocks and the central block.

2. The bicycle pedal of claim 1, wherein, the thickness of the fastening portion of the central block is smaller than the thickness of the adjacent end of the stepping portion so that an upper retaining surface and a lower retaining surface can be formed for butting on an adjacent side of the fastening portion of the upper block and the lower block, respectively.

3. The bicycle pedal of claim 1, wherein, the thickness of the fastening portion of the upper block is smaller than the thickness of the adjacent end of the stepping portion so that a lateral retaining surface can be formed for butting on an adjacent side of the fastening portion of the central block, respectively.

4. The bicycle pedal of claim 1, wherein, the thickness of the fastening portion of the lower block is smaller than the thickness of the adjacent end of the stepping portion so that a lateral retaining surface can be formed for butting on an adjacent side of the fastening portion of the central block, respectively.

5. The bicycle pedal of claim 1, wherein, an anti-slip structure is provided on the surface of each said stepping portion of the central block.

6. The bicycle pedal of claim 5, wherein, the anti-slip structure is constructed from a plurality of anti-slip protrusions.

7. The bicycle pedal of claim 1, wherein, an anti-slip structure is provided on the upper and lower surfaces of each said rib, respectively.

8. The bicycle pedal of claim 7, wherein, the anti-slip structure is constructed from a plurality of grooves.

9. The bicycle pedal of claim 1, wherein, an anti-slip structure is provided on the upper and lower surfaces of each of the blocks, respectively.

10. The bicycle pedal of claim 9, wherein, the anti-slip structure is constructed from a plurality of grooves.

* * * * *